United States Patent
Kelly

(10) Patent No.: US 9,533,763 B1
(45) Date of Patent: Jan. 3, 2017

(54) PORTABLE BAGGAGE COMPARTMENT

(71) Applicant: Terry Kelly, Green Grove Springs, FL (US)

(72) Inventor: Terry Kelly, Green Grove Springs, FL (US)

(*) Notice: Subject to any disclaimer, the term of this patent is extended or adjusted under 35 U.S.C. 154(b) by 0 days.

(21) Appl. No.: 15/173,976

(22) Filed: Jun. 6, 2016

(51) Int. Cl.
 *B64D 11/00* (2006.01)
 *B64D 11/02* (2006.01)

(52) U.S. Cl.
 CPC .......... *B64D 11/003* (2013.01); *B64D 11/02* (2013.01)

(58) Field of Classification Search
 CPC ......... B64D 11/00; B64D 11/02; B64D 11/04; B64D 11/003
 USPC . 312/293.1, 293.3, 351; 244/118.1; 220/1.5; 296/184.1, 186.1
 See application file for complete search history.

(56) References Cited

U.S. PATENT DOCUMENTS

| | | | | |
|---|---|---|---|---|
| 3,345,119 A | * | 10/1967 | Saddler | A47B 96/16 312/139 |
| 3,598,273 A | * | 8/1971 | Rau | B65D 88/14 220/1.5 |
| 3,672,529 A | * | 6/1972 | Feddersen | B65D 88/14 16/350 |
| 3,853,239 A | * | 12/1974 | Meller | B65D 88/14 220/1.5 |
| 3,907,148 A | * | 9/1975 | Meller | B65D 88/14 220/1.5 |
| 4,776,903 A | * | 10/1988 | Nordskog | B64D 11/04 156/153 |
| 5,642,923 A | * | 7/1997 | Meacham | B65D 25/06 108/106 |
| 6,007,025 A | | 12/1999 | Coughren et al. | |
| 6,050,663 A | * | 4/2000 | Schoellmann | A47B 45/00 220/23.86 |
| 6,161,714 A | * | 12/2000 | Matsuura | B62D 29/045 220/1.5 |
| 6,622,965 B1 | | 9/2003 | Sergiy | |
| 2006/0124802 A1 | | 6/2006 | Ritts et al. | |
| 2009/0278429 A1 | * | 11/2009 | Erickson | B64D 11/0015 312/265.1 |
| 2014/0332629 A1 | * | 11/2014 | Hashberger | B64D 11/00 244/118.6 |
| 2014/0355282 A1 | * | 12/2014 | Cuddy | B64C 1/1407 362/471 |
| 2015/0307269 A1 | * | 10/2015 | Steinert | B65D 88/14 220/1.5 |

* cited by examiner

*Primary Examiner* — James O Hansen
(74) *Attorney, Agent, or Firm* — Lawrence J. Gibney; Mitchell R. Ghaneie

(57) ABSTRACT

A portable baggage compartment that will fit snugly within the confines of a passenger airplane and conform to the shape of the plane's interior curvature is contemplated by this device. The device will be made from suitable material that can be securely fastened to the interior compartment of an airplane. The device will comply with all Government regulations and will be comprised of a series of compartments that can be used to stow material.

4 Claims, 7 Drawing Sheets

PORTABLE BAGGAGE COMPARTMENT

BACKGROUND OF THE INVENTION

A. Field of the Invention

This invention relates to providing a compartment for storing items needed or desired for a flight on a private jet or similarly sized aircraft.

B. Prior Art

There are various types of baggage compartments installed on airplanes and jets for storing baggage and other carryon items. A very typical compartment is the overhead compartment found in many commercial airlines. This type of compartment is taught in Sergiy U.S. Pat. No. 6,622,965. The Sergiy overhead compartment teaches a cover with an opening mechanism that prevents undesired opening during flight. This is particularly important for safety since items and luggage are being stored above the heads of passengers.

Another type of device utilizes in aircraft is a collapsible mobile platform taught in Ritts et al. ("Ritts") U.S. Patent Application Publication Number 2006/0124802. Ritts describes a structure to be used on the interior of an aircraft for galleys, lavatory, or privacy cabin. However, Ritts teaches against pre-assembled structures and is not intended to fit against the concave wall of an aircraft.

BRIEF SUMMARY OF THE INVENTION

This present invention involves providing a portable baggage compartment that may be used in private jets and other aircraft. The compartment is to be made out of a durable lightweight material and is designed to fit against the interior wall of the jet's cabin between the lavatory and the wall of the cockpit of a jet. The compartment will be comprised of lid, two side panels, a front panel, a back panel, a sloped panel, a divider, and shelves. This compartment is intended to accommodate binders, food, beverages, clothes, and any other necessary or desired items.

Due to the placement of the compartment next to the lavatory it is anticipated that it may also provide an interior container for water which can be used for use by passengers while in the lavatory. Some private jets do not provide multi-flush facilities in the lavatory of the aircraft. The addition of a concealed water container will allow the jet lavatory to be modified to provide a more accommodating lavatory for passengers.

NUMBERING REFERENCE

Figure 1:
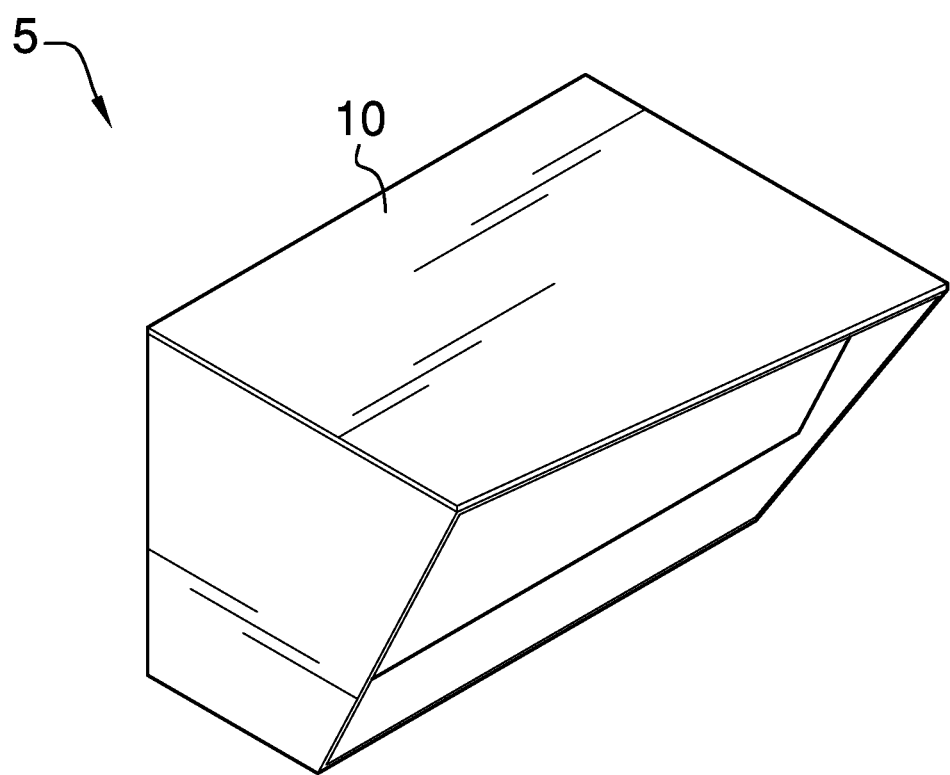
FIG. 1 is a back isometric view of the device.

5—Device
6—First front compartment
7—Second front Compartment
8—Back compartment
10—Lid
11—First side panel
12—Second side panel
13—First Bottom panel
15—Removable shelves
16—Finger Hole
20—Divider
25—Back Panel
30—Removable shelve support
35—Sloped panel
36—Second Bottom panel
40—Cargo Net
45—Lavatory

DETAILED DESCRIPTION OF THE EMBODIMENTS

The present invention provides passengers and flight crew on jet planes or similarly sized aircrafts with additional storage compartments for luggage or other carryon items. The present baggage compartment is intended to be portable and is comprised of a lid 10, a first side panel 11, a second side panel 12, a first bottom panel 13, a second bottom panel 36, a sloped panel 35, a front panel 9, take out shelves 15 with finger holes 16, removable supports 30, a divider 20, and a back panel 25. It is specifically designed so that it will fit in the space of an aircraft that is curved.

The device 5 is placed in areas of a plane where baggage can be loose. For example, in some jets loose items are placed between the lavatory 45 and the wall of the cockpit. A cargo net 40 is sometimes used to secure large items in flight. Currently, jets with this design do not provide a compartment to store or support luggage and other various items. Oftentimes the material is loosely stowed in an open space. Storing material in this fashion is not ideal as the items will shift during a flight in addition to appearing to be unorganized.

Figure 7:
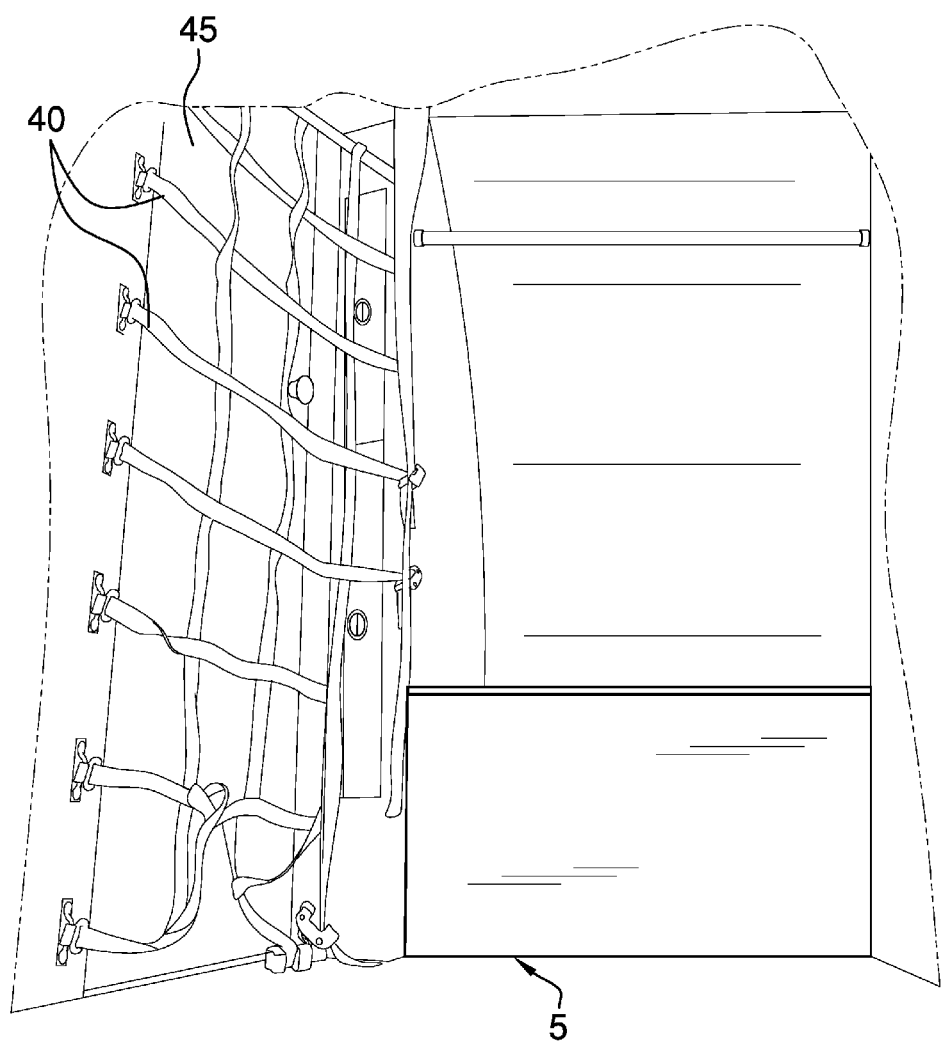
FIG. 7 is an in-use view of the claimed device in the cabin of airplane.

Additionally the open space is frequently positioned in close proximity to the lavatory. Many lavatories on smaller aircraft do not have a means to recirculate the water including the waste within the toilet. Part of the area within the compartment may be used to store a supply of water that can be used to cleanse the lavatory, if needed, in addition to the areas dedicated to the storage of other needed gear. As depicted in FIG. 7 the device may be placed in close proximity to the lavatory 45 in the event that the user wishes to store a supply of water to cleanse the lavatory. If that use is selected appropriate tubing and/or piping will also be provided.

The cabin of an airplane is concave in nature as well as varying in width from the nose of the plane throughout the body. The present invention accommodates the variations and mates with the curved structures of a plane, while still providing a shape that can house baggage and other items.

Figure 2:
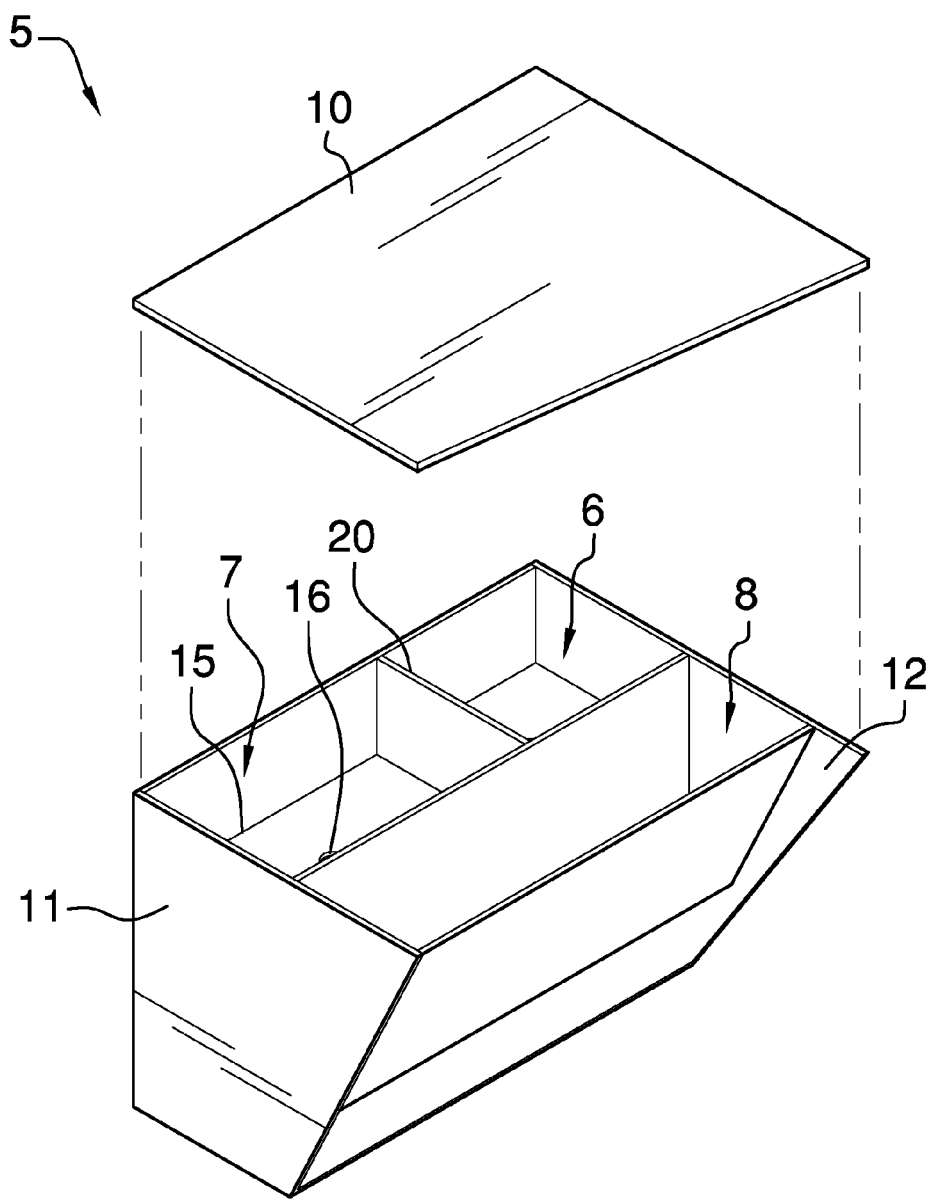
FIG. 2 is a back isometric view of the device with the lid removed from the top of the device.
Figure 3:
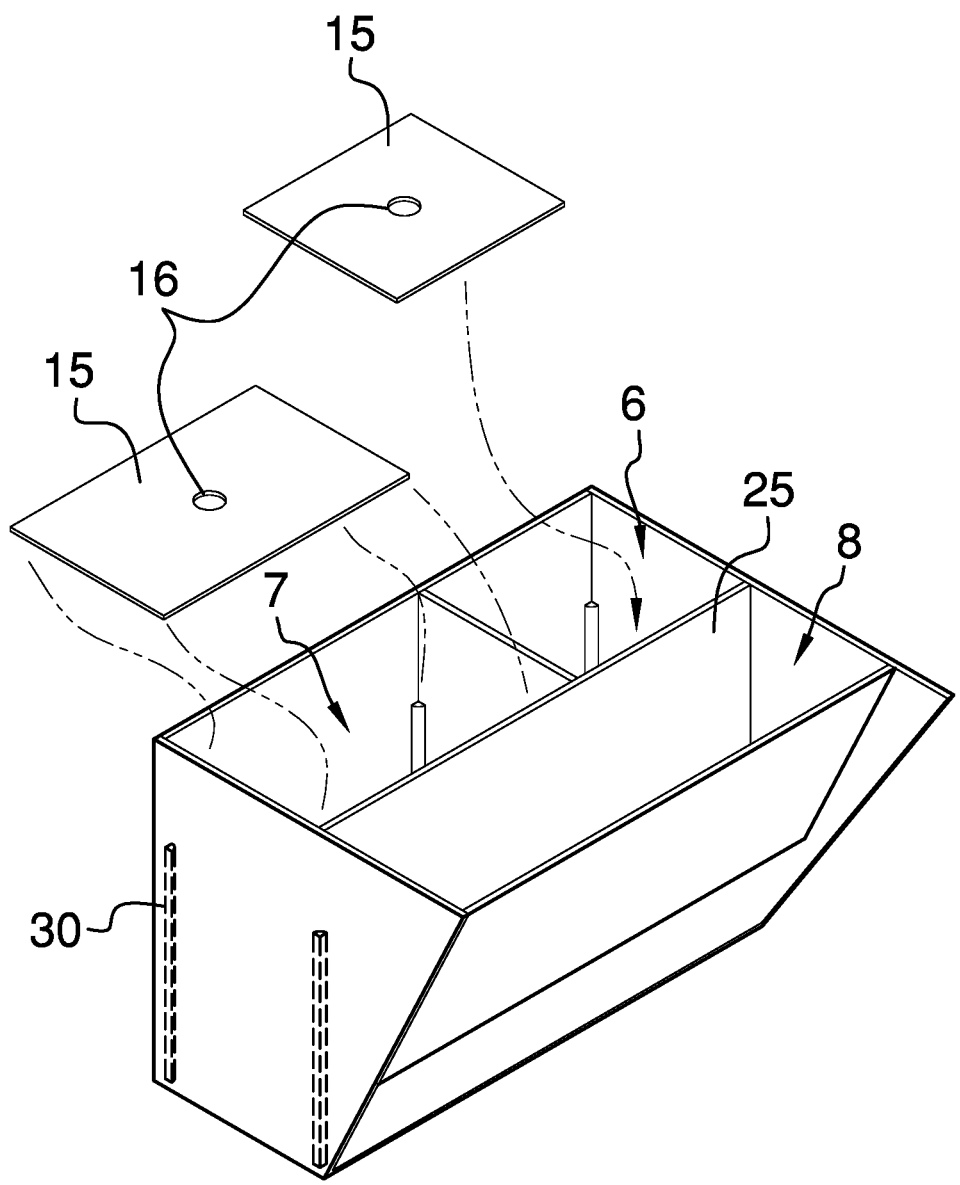
FIG. 3 is a back isometric exploded view of the device without the lid.
Figure 4:
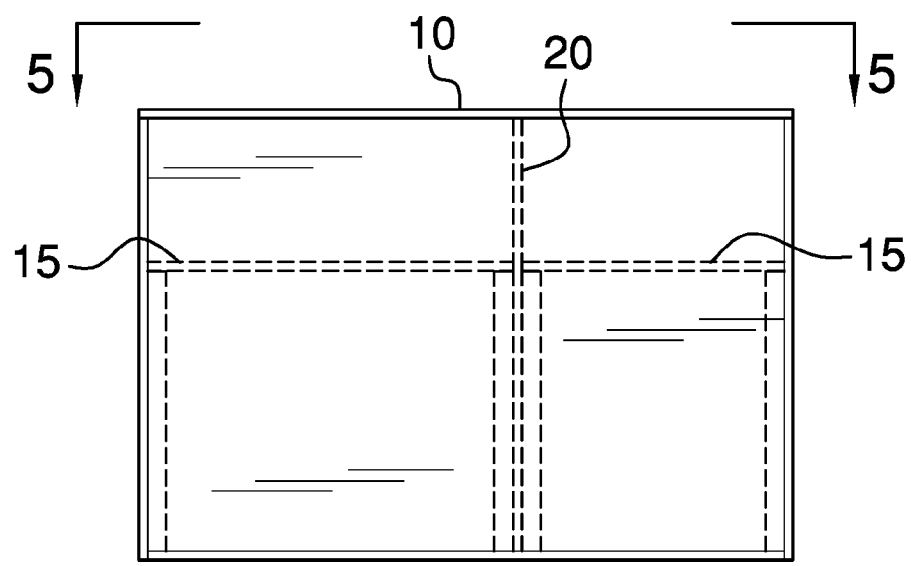
FIG. 4 is a front view of the device depicting shelves, a divider, and supports for the shelves.
Figure 5:
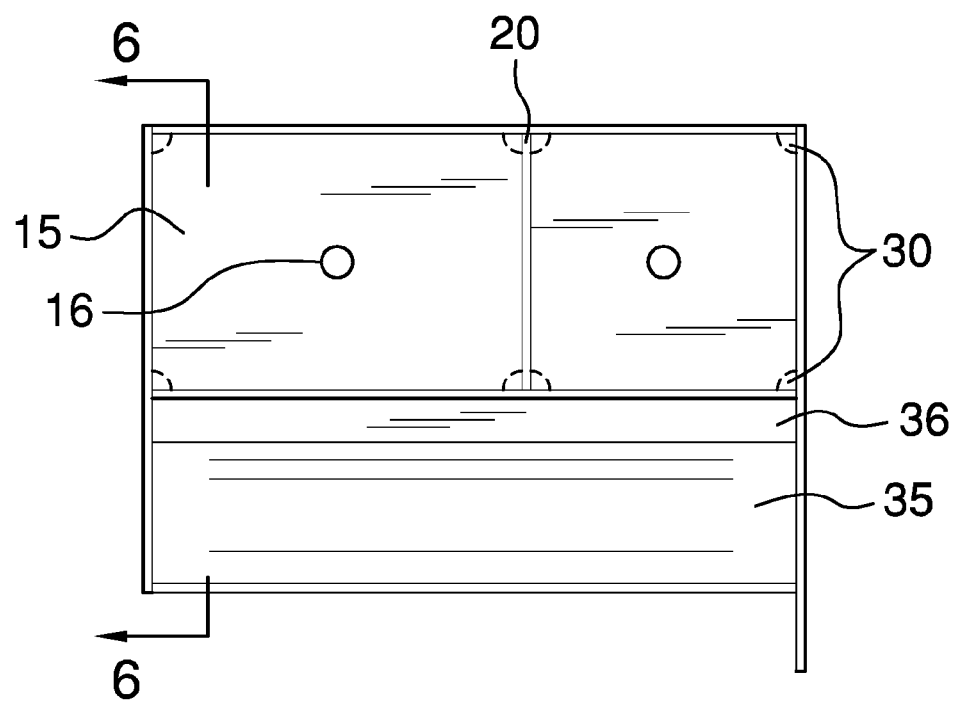
FIG. 5 is a cross-sectional view from FIG. 4, showing a plurality of shelves, a plurality of finger holes, a divider, front panel, first side panel, second side panel, a back panel, a sloped panel, a second bottom panel, and a plurality of shelve supports.

The baggage compartment is designed to have a first side panel 11 and a second side panel 12. Both side panels provide a top section and a bottom section. The top section of side panel 11 and side panel 12 are longer in length than the respective bottom section, which can be seen in FIG. 2. Also, the top section of the first side panel 11 is shorter in the length than the top section of the second side panel 12. The difference in length is intended to accommodate the varying diameter and curve of the jet plane's cabin. The lid 10 of the device is also irregular in shape and provides a side that accommodates the same variation of the jet plane's cabin. However, the bottom side of each of the first side panel 11 and second side panel 12 are to be approximately equal in length.

This device is not intended to accommodate a single type of aircraft but is intended to be used in a variety of aircraft.

The device contains a series of compartments in which to stow various pieces of gear or equipment. A pair of removable shelves 15 with finger holes 16 is provided to stow various items. In order to maintain the removable shelves 15 over the opening removable shelf supports 30 have been installed in the interior space of the respective cavities that will be covered by the removable shelves 15.

Figure 6:
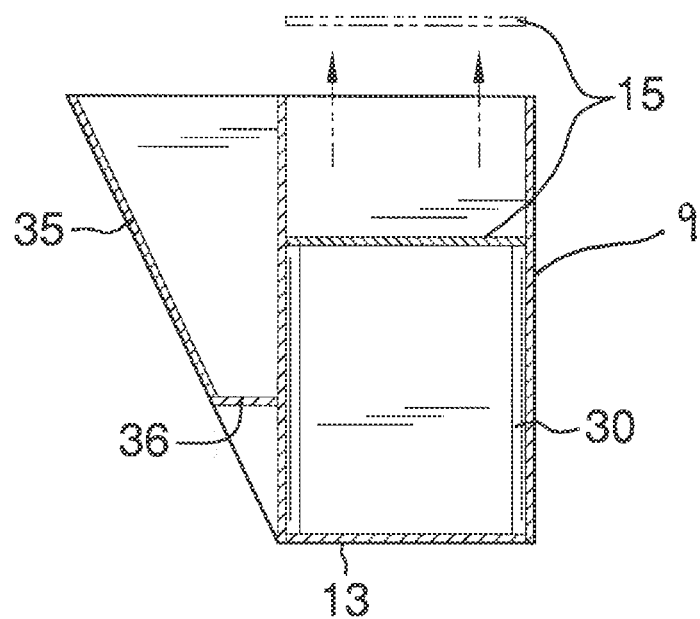
FIG. 6 is a cross-sectional view from FIG. 5, which shows the shelves, a plurality of shelve supports, a sloped panel, a back panel, a first side panel, a first bottom panel, and a second bottom panel.

A first bottom panel 13 and second bottom panel 36 are provided as shown in FIG. 6. A back panel 25 is provided perpendicular to the first side panel 11 and second side panel 12. A divider 20 is provided perpendicular to the front panel 9 and back panel 25.

The device 5 is designed to be portable and can be moved from aircraft to aircraft. A means to secure the device to the interior of the aircraft may also be provided but no specific means is being claimed. The device will be designed so that it complies with all applicable Government regulations regarding aircraft. While the choice of material is not critical to the design of the device, the appropriate material should take into consideration the weight of the structure and its durability.

While the embodiments of the invention have been disclosed, certain modifications may be made by those skilled in the art to modify the invention without departing from the spirit of the invention.

The inventor claims:

1. A portable baggage compartment, which is comprised of:
 a. a front panel;
   wherein the front panel is rectangular in shape;
 b. a first side panel;
   wherein the first side panel has a top section, a front section, a bottom section and a sloped section;
 c. a second side panel;
   wherein the second side panel has a top section, a front section, a bottom section and a sloped section;
   wherein the top section of the second side panel is longer in length than the top section of the first side panel;
 d. a sloped panel;
   wherein the sloped panel has a top section, a first side section, a second side section, and a bottom section;
   wherein the first side section of the sloped panel is aligned with the slope of the sloped section of the first side panel;
 e. a lid;
   wherein the lid provides a front section, a first side section, a second side section, and a back section;
   wherein the said front section of lid lays flush against said front section of front panel;
   wherein said first side section of lid lays flush against said top section of first side panel;
   wherein said second side section of lid lays flush against said top section of second side panel;
   wherein said back section of lid lays flush with at least a portion of said top section of said second side panel;
 f. a back panel;
   wherein the back panel has a top section, a first side section, a second side section, and a bottom section;
 g. a first bottom panel;
   wherein the first bottom panel lays flush with the bottom section of said front panel, said first side panel, said second side panel, and said back panel;
 h. a second bottom panel;
   wherein the second bottom panel is provided between the sloped panel and the back panel;
 i. a plurality of shelf supports;
   wherein the plurality of shelf supports are provided in an interior of the compartment;
   wherein the plurality of shelf supports are removable;
 j. a plurality of takeout shelves;
   wherein the plurality of takeout shelves provide at least one finger hole.

2. The device as described in claim 1 wherein a plurality of dividers are provided.

3. The device as described in claim 1 wherein the top section of the front panel, back panel and sloped panel are all approximately parallel to each other.

4. The device as described in claim 1 wherein at least one divider is provided.

* * * * *